(12) United States Patent
Rosenberg et al.

(10) Patent No.: US 7,691,348 B2
(45) Date of Patent: Apr. 6, 2010

(54) PROCESS FOR THE REMOVAL OF ANIONIC IMPURITIES FROM CAUSTIC ALUMINATE SOLUTIONS

(75) Inventors: Steven P. Rosenberg, Australind (AU); Wayne Tichbon, Eaton (AU); Alex R. Aboagye, Bunbury (AU); Catherine A. Heath, Aix-en-Provence (AU); Darrel J. Wilson, Australind (AU)

(73) Assignee: BHP Billiton Worsley Alumina Pty Ltd., Collie, WA (AU)

( * ) Notice: Subject to any disclaimer, the term of this patent is extended or adjusted under 35 U.S.C. 154(b) by 909 days.

(21) Appl. No.: 10/474,627

(22) PCT Filed: Apr. 10, 2002

(86) PCT No.: PCT/AU02/00459

§ 371 (c)(1),
(2), (4) Date: Mar. 23, 2004

(87) PCT Pub. No.: WO02/083564

PCT Pub. Date: Oct. 24, 2002

(65) Prior Publication Data

US 2004/0146455 A1     Jul. 29, 2004

(30) Foreign Application Priority Data

Apr. 11, 2001   (AU) ..................... PR4370

(51) Int. Cl.
*C01F 7/00* (2006.01)
(52) U.S. Cl. .................. 423/121; 423/122; 423/130
(58) Field of Classification Search .......... 423/121, 423/122, 130
See application file for complete search history.

(56) References Cited

U.S. PATENT DOCUMENTS

| | | | |
|---|---|---|---|
| 2,208,173 A * | 7/1940 | Urbain et al. | 423/181 |
| 2,557,891 A * | 6/1951 | Porter | 423/127 |
| 4,597,952 A | 7/1986 | Fabre et al. | |
| 4,668,485 A | 5/1987 | Cresswell et al. | |
| 5,470,559 A | 11/1995 | Grolman | |
| 5,888,461 A | 3/1999 | Soirat | |

FOREIGN PATENT DOCUMENTS

| | | |
|---|---|---|
| AU | 32197/93 A | 8/1993 |
| GB | 1527948 A | 10/1978 |
| SU | 346924 A | 4/1978 |
| WO | WO 99/29627 A | 6/1999 |
| WO | 00/10918 * | 3/2000 |
| WO | WO 00/18684 A | 4/2000 |
| WO | 00/56660 * | 9/2000 |
| WO | WO 00/56660 A | 9/2000 |
| WO | WO 02/11856 A1 | 2/2002 |

OTHER PUBLICATIONS

Roach, Light Metals, 97, Ed; R.D. Peterson, The Minerals Metals and Materials Society.*

* cited by examiner

*Primary Examiner*—Steven Bos
(74) *Attorney, Agent, or Firm*—Edell, Shapiro & Finnan, LLC

(57) ABSTRACT

A process for removing anionic impurities from a caustic aluminate solution having aqueous tetrahydroxy aluminate ions is described. A caustic aluminate solution is obtained such that anionic impurities are partially or substantially substituted into tetrahydroxy aluminate ions to form substituted aluminate ions. A suitable calcium compound, such as quicklime, is reacted in a conventional slaker (10) with a slaking solution, for example water, and stored in an agitated storage tank (12). The resulting slurry is pumped to a reaction vessel (14) where it is reacted with a caustic aluminate solution under appropriate conditions such that the calcium compound is converted into tricalcium aluminate (TCA) precipitate. Upon reaction substituted aluminate ions are substantially incorporated within the TCA precipitate to form a substituted TCA precipitate enabling the anionic impurities to be removed from the solution via the substituted TCA precipitate for disposal or recovery. The caustic aluminate liquor may be optionally fortified with an anionic impurity by mixing it in a mixing tank (16) with the anionic impurity.

28 Claims, 2 Drawing Sheets

PROCESS FOR THE REMOVAL OF ANIONIC IMPURITIES FROM CAUSTIC ALUMINATE SOLUTIONS

FIELD OF THE INVENTION

The present invention relates to a process and apparatus for the removal of anionic impurities from caustic aluminate solutions, and relates particularly, though not exclusively to such a process and apparatus for removing anionic impurities from Bayer process liquors of an alumina refinery.

BACKGROUND TO THE INVENTION

In the Bayer process, a concentrated sodium aluminate solution is produced by digesting milled bauxite in a caustic solution under conditions of elevated temperature and pressure. During the milling and digestion steps, a variety of species other than alumina are also extracted and enter the liquor stream. In the Bayer process, these species are generally considered to be undesirable impurities, and due to the cyclic nature of the Bayer process, can accumulate in the refinery's liquor streams unless they are removed by some means. Each of these species will eventually reach a steady state concentration that is a function of the input with bauxite and other sources and the output with the refinery's red mud residue, side-stream removal processes and with the product alumina.

Efficient removal processes for many of the most prevalent Bayer process impurities have been developed. For example, a process for the removal of carbonate ions is described in commonly owned International Application No. PCT/AU99/00757. Sulphate and/or oxalate are removed from caustic aluminate solutions in a process disclosed in commonly owned International Application No. PCT/AU00/00208. However, there are many other species that are typically present at low or trace concentrations in the liquor stream for which to date there are no specific processes for removal or control. These include fluoride and a number of metallic oxo-anions, such as vanadate.

Often, the concentration of most of these species is low because their content in bauxite is low, and also because they are partially removed in an uncontrolled manner as a side effect of the main unit operations of the Bayer process. One of the most important and undesirable of these side-reactions is incorporation of these anions into gibbsite during precipitation, which results in contamination of the refinery's product.

More harmful effects can occur if one or more of these impurities starts to accumulate. The fluoride anion is particularly damaging, as it is capable of forming low-solubility sodium double salts with a number of other anions, such as sulphate, phosphate, silicate and vanadate. This will tend to occur in the most concentrated liquor streams in the alumina refinery, particularly the evaporators, forming a scale that reduces the evaporator's efficiency, adversely affecting productivity and increasing operating costs. At sufficiently high concentrations, these double salts can also co-crystallise in the precipitation circuit, resulting in poor physical and chemical product quality characteristics and very likely provoking a severe loss of productivity.

It is common in some alumina refineries to add lime prior to, or within, digestion to control the phosphate and titanate concentration in the liquor stream, ostensibly to precipitate these anions as calcium phosphate or calcium titanate. This procedure can be effective in controlling these impurities, but is inefficient and can lead to increased calcium contamination in the refinery's product.

To the inventors' knowledge, there have been no processes published which deal with the removal of sodium fluoride or sodium vanadate from caustic aluminate solutions such as Bayer refinery liquors. However, several processes describe the recovery of the aluminium and fluoride values from spent potlining material from aluminium reduction cells. In U.S. Pat. No. 5,470,559, the potlining material is first dissolved in a caustic soda solution to generate a fluoride-rich sodium aluminate solution. This solution is then evaporated to remove fluoride via the crystallisation of fluoride salts. The precipitated fluoride salts are separated from the liquor and then reacted with a calcium hydroxide slurry to precipitate calcium fluoride, while the clarified caustic aluminate solution may be directed to the liquor stream of an alumina refinery. U.S. Pat. No. 5,776,426 discloses a similar process in which the potlining material is simultaneously leached and reacted with lime to precipitate calcium fluoride. The solids are separated, and the clarified liquor again used for some suitable purpose such as Bayer precipitation. In both cases, the caustic aluminate solution generated in the process contains a substantial residual concentration of sodium fluoride, and is hence probably unsuitable for adaptation for use in an alumina refinery. Furthermore, unless the solid calcium fluoride produced in these processes is disposed of in a dry disposal area, it may react with dilute caustic aluminate solutions, releasing the fluoride ions into solution such that they ultimately return to the refinery.

Some of the inorganic anions extracted from bauxite are of potential value if they can be economically purified and recovered. However, the inventors are unaware of any published processes for doing so, other than the solvent-extraction of gallium from Bayer liquors as disclosed in, for example, EP 206081. A process which describes the extraction of rare earth elements from red mud by digesting the mud in a dilute acid solution is disclosed in U.S. Pat. No. 5,030,424, but suffers from the same limitations as all such red mud-based processes, in that the volume of material to be processed is uneconomically large.

Under the appropriate conditions, caustic aluminate solutions will react with calcium from some suitable source such as slaked lime to form the thermodynamically stable and sparingly soluble tricalcium aluminate, $Ca_3[Al(OH)_6]_2$. This material is commonly referred to in alumina industry parlance as TCA, or C3AH6 in cement industry notation. This reaction is utilised most commonly in the alumina industry to produce TCA crystals of a controlled particle size for use as a filter aid in the polishing or security filtration facility of the refinery, in which fine residual mud particles are "polished" from the green (or pregnant) liquor stream. The use of TCA for this purpose, and a process for the creation of an improved TCA filter aid are described in commonly owned International Application No: PCT/AU01/00886, filed on 20 Jul. 2001.

It has been known for some time that if the sodium aluminate solution also contains an appreciable concentration of sodium silicate, then at least some of the silicate will become incorporated into the tricalcium aluminate. This has been interpreted as a solid solution of calcium aluminosilicate within tricalcium aluminate, with the silica replacing water (Roach, *Light Metals* 2000, 97, Ed. R. D. Peterson, *The Minerals Metals and Materials Society,* 2000). To the inventors' knowledge, this behaviour has not been specifically utilised on an industrial scale to remove sodium silicate from Bayer process liquors.

It will be clearly understood that, although a number of prior art publications are referred to herein, this reference does not constitute an admission that any of these documents forms part of the common general knowledge in the art, in Australia or in any other country.

From the preceding discussion, while there are a number of processes available which remove impurities that are at relatively high concentrations in caustic aluminate solutions, there remains a need for a process which can remove some of the other impurity anions present at low or trace concentrations, in a form that allows easy and environmentally acceptable disposal or recovery.

SUMMARY OF THE INVENTION

The present invention was developed with a view to providing a process and apparatus for efficiently removing anionic impurities present at low concentrations in Bayer process liquors. However it will be apparent that the same or a similar process and apparatus may be employed for removing anionic impurities from other caustic aluminate solutions.

Throughout this specification the term "comprising" is used inclusively, in the sense that there may be other features and/or steps included in the invention not expressly defined or comprehended in the features or steps subsequently defined or described. What such other features and/or steps may include will be apparent from the specification read as a whole.

In this document, common alumina industry terminology is used to denote the concentrations of the major species present in caustic aluminate solutions. Thus, the aluminate concentration will be described in terms of 'A', the equivalent concentration of alumina, $Al_2O_3$, in g/L. The caustic concentration is referred to as 'C', which is the sum of the sodium aluminate and sodium hydroxide concentrations, and is expressed as the equivalent concentration of sodium carbonate, in g/L. The 'S' concentration refers to the sum of the 'C' concentration and the actual sodium carbonate concentration, this sum again being expressed as the equivalent concentration of sodium carbonate, in g/L. While sodium salts are referred to throughout this document, the descriptions could equally apply to potassium salts, and the process described herein should be taken as applying equally to caustic aluminate solutions prepared from potassium salts.

According to one aspect of the present invention, there is provided a process for removing anionic impurities from a caustic solution having aqueous tetrahydroxy aluminate ions therein, the process comprising the steps of:

substituting at least one of the hydroxyl groups in the aqueous tetrahydroxy aluminate ions with an anionic impurity to form substituted aluminate ions; and removing the substituted aluminate ions.

Preferably, the process further comprises the step of increasing the concentration of the aqueous tetrahydroxy aluminate ions in the caustic solution.

Preferably, the process further comprises the step of increasing the concentration of anionic impurities in the caustic solution.

Preferably, the process further comprises the step of increasing the concentration of the tetrahydroxy aluminate ions and the concentration of the anionic impurities in the caustic solution.

Preferably, the process further comprises the step of adding to the solution one or more target anionic impurities selected from the group comprising fluorides, vanadates, phosphates, titanates or combinations thereof. More preferably, one or each of the target anionic impurities is added in the form of a precipitated salt of the target anionic impurity.

Preferably, the step of removing the substituted aluminate ions includes the step of reacting the substituted aluminate ions with a calcium compound to precipitate substituted tricalcium aluminate incorporating said anionic impurities. More preferably, the process further comprises the step of controlling the process to promote complete consumption of the calcium compound.

Preferably, the process further comprises the step of agitating the caustic solution. More preferably, the step of agitating comprises the step of vigorously agitating the caustic solution.

Preferably, the process comprises the step of heating the caustic solution. More preferably, the step of heating is conducted at a temperature within the range of 80 to 195° C. More preferably, the step of heating is conducted at a temperature in the range of 95 to 105° C.

Preferably, the calcium compound is calcium hydroxide. More preferably, the calcium compound is in the form of a slaked lime slurry.

Preferably, the caustic solution has a high 'C'. More preferably, the 'C' is greater than 150 g/L. More preferably still, the 'C' is greater than 200 g/L.

Preferably, the caustic solution has an 'A/C' ratio greater than 0.65. Alternatively, the caustic solution has an 'A/C' between 0.425 and 0.69.

Preferably, the process comprises the step of adjusting the relative volumetric ratio of the caustic solution to the lime slurry to be at least 10:1. More preferably, the relative volumetric ratio of the caustic solution to the lime slurry is at least 15:1.

Preferably, the concentration of lime slurry is not greater than 15% w/w of CaO.

Preferably, the process comprises the step of removing precipitated substituted TCA.

More preferably, the process further comprises the step of recovering at least one of the anionic impurities from the precipitated substituted TCA. More preferably still, the anionic impurities recovered are selected from the group comprising fluorides, vanadates, phosphates, titanates or combinations thereof.

Preferably, the process comprises the step of using the removed precipitated substituted TCA as a filter aid.

According to a second aspect of the present invention, there is provided a substituted tri-calcium precipitate comprising anionic impurities incorporated within the tri-calcium aluminate structure. Preferably, the anionic impurities are selected from the group comprising fluorides, vanadates, phosphates, titanates or combinations thereof.

According to a third aspect of the present invention, there is provided a tri-calcium aluminate filter aid comprising a substituted tri-calcium aluminate precipitation(s).

BRIEF DESCRIPTION OF DRAWINGS

In order to facilitate a more comprehensive understanding of the nature of the invention, illustrative embodiments of the process and apparatus for removing anionic impurities from a caustic aluminate solution will now be described in detail, by way of example only, with reference to the accompanying drawings, in which.

DETAILED DESCRIPTION OF THE PREFERRED EMBODIMENTS

Figure 1:
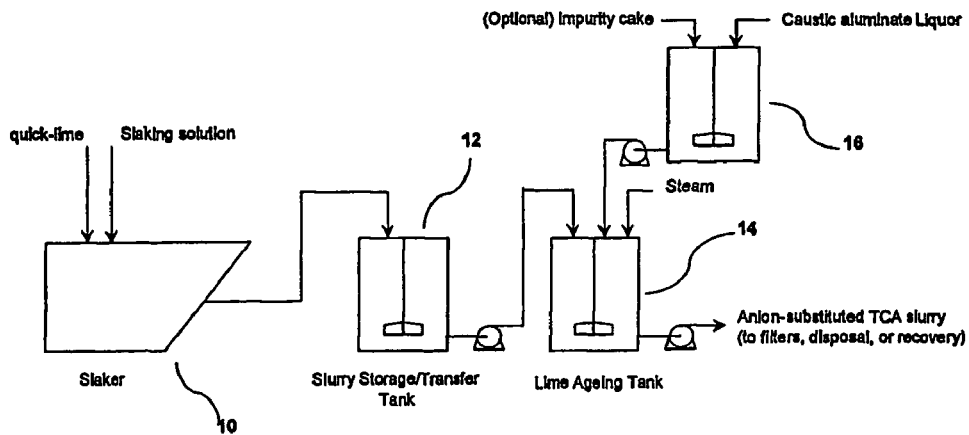
FIG. 1 illustrates schematically one embodiment of the process and apparatus in accordance with the present invention.

The process of the present invention typically provides a means of effectively removing low-level anionic impurities including fluoride and vanadate from caustic aluminate liquors, and provides an improved or alternative process for the removal of impurities such as phosphate and titanate from these liquors. Advantageously, the impurities may be accumulated and concentrated within a crystalline solid that is easily separable from the purified solution and which is amenable to further processing to recover the values, if so desired.

The invention is based on the discovery that by forming tricalcium aluminate under the appropriate conditions in a caustic aluminate solution containing a range of impurity anions, the impurity anions are removed from solution by incorporation into the calcium aluminate structure. Anions which can be so incorporated include, but are not limited to, fluoride, vanadate, titanate, and phosphate.

A surprising aspect of this discovery is that the efficiency of impurity removal increases with rising aluminate concentration. A further unexpected outcome is that it was found that direct reaction of lime or calcium ions with the impurity anions to form insoluble calcium salts (such as, for example, $CaF_2$) does not occur to any detectable extent in the presence of aluminate ions, despite many of these calcium salts having exceedingly low solubility products.

Without wishing to be bound by theory, the inventors believe that in caustic aluminate solutions, many anionic impurity species can substitute for at least one of the hydroxyl ions in the aqueous tetrahydroxy aluminate ion. Consequently, these impurity anions are present in solution as an equilibrium mixture of the free aquated anions and as a bound species within a substituted aluminate ion. The concentration of these substituted aluminate ions will be determined by equilibrium between the impurity ions and the unsubstituted (or "normal") tetrahydroxy aluminate anions, as indicated in equation (1).

$$Al(OH)_4^- + X^- \Leftrightarrow [Al(OH)_3X]^- + OH^- \tag{1}$$

In this equation, $X^{31}$ represents the impurity anion, and it can be seen that since this is an equilibrium reaction, an increase in the tetrahydroxy aluminate concentration, the impurity anion concentration, or both, will result in a higher concentration of the substituted aluminate ion concentration.

A further outcome of equation (1) is that if the substituted aluminate anion is continuously removed from solution by some means, the impurity anion and tetrahydroxy aluminate ion will continue to react until one or both species is almost completely depleted, the residual concentration being dependant upon the formation constant for the substituted aluminate ion, the solution composition and temperature. Generally, the tetrahydroxy aluminate ion will be in considerable excess, so the impurity anion will be depleted first.

When a calcium compound is introduced into this system in some suitable form (preferably as a slurry of slaked lime, although quicklime or calcium chloride will suffice) and under the appropriate conditions, it will react with both forms of the aluminate ion to produce TCA. Equations (2) and (3) describe two possible overall reactions for the tetrahydroxy aluminate ion and substituted aluminate ion respectively. Since both forms of the aluminate ion will initially be present, in normal practice the product formed is likely to be a mixture of both the substituted and unsubstituted forms of TCA.

$$3Ca(OH)_2 + 2Al(OH)_4^- \rightarrow Ca_3[Al(OH)_6]_2 + 2OH^- \tag{2}$$

$$3Ca(OH)_2 + 2[Al(OH)_3X]^- \rightarrow Ca_3[Al(OH)_5X]_2 + 2OH^- \tag{3}$$

From this discussion, it would be expected that the amount of impurity incorporated into the TCA during this reaction would be proportional to the relative concentrations of the substituted and tetrahydroxy aluminate ions in solution. However, a very surprising discovery is that the substituted aluminate ion appears to be preferentially incorporated in TCA relative to the tetrahydroxy aluminate ion. For example, a solution containing only 1% fluoride-substituted aluminate ion (moles$[Al(OH)_3F]^-$ per mole $Al(OH)_4^-$) will react with slaked lime to give a fluoride-substituted TCA containing approximately 18 % fluoride (same basis). Since the impurity anion must be present as the substituted aluminate ion in solution to be removed in TCA, the higher the substituted aluminate concentration in solution, the greater the proportion of impurity that reports to the TCA. Clearly, from equation (1), the efficiency of impurity removal will be highest when the net aluminate concentration is also high.

As noted above, the impurity anions do not appear to precipitate in the form of their simple calcium salts in the presence of the aluminate ion. Consequently, maximum removal performance will only be obtained by ensuring conditions that result in the highest concentration of substituted aluminate ion in solution, and by reacting this solution with lime under conditions that ensure that the lime is almost completely converted to TCA. It is most preferable that sufficient caustic aluminate liquor is available to ensure that the TCA so formed contains the highest possible proportion of substituted TCA, whilst ensuring the maximum removal of impurity from solution.

In its most general form, the preferred process involves the following steps:

Obtaining a suitable caustic aluminate solution in which the tetrahydroxy aluminate concentration and/or anionic impurity concentration are high, such that the anionic impurity is partially or substantially substituted into the aluminate ions; and Reacting this solution with a calcium compound under conditions of high temperature and vigorous agitation and for sufficient time such that the calcium compound is converted substantially into a substituted tricalcium aluminate precipitate, within the structure of which the anionic impurity is concentrated;

The calcium compound may be provided in any suitable physical form such as a slurry, solution or solid. Suitable compounds include, but are not restricted to quicklime, calcium chloride, calcium carbonate or calcium hydroxide. However, the preferred calcium compound is calcium hydroxide, in the form of a slaked lime slurry in water or other suitable solution (hereafter referred to simply as "lime"). Species such as calcium chloride and calcium carbonate are less preferable, since their reaction will release chloride or carbonate anions into solution.

Ideally, the caustic aluminate solution will be highly supersaturated with respect to the tetrahydroxy aluminate ion. The efficiency of removal decreases with decreasing aluminate concentration, requiring both more lime and more liquor to remove the same mass of anionic impurity. The preferred solution in an alumina refinery will be "green" or "pregnant" liquor, with a 'C' concentration of greater than 150 g/L and an 'A/C' ratio of in excess of 0.65. This liquor may be used as obtained from the refinery or optionally fortified with the target anionic impurity by some means. For example, fluoride removal can be enhanced without increasing lime consumption or the volume of liquor to be processed by the addition of precipitated fluoride salts. These could be obtained, for example, by deep evaporation of a spent liquor, followed by cooling, and separation of the precipitated fluoride salts, which are then mixed with the caustic aluminate solution or fed directly to the reactor.

The reaction of the caustic aluminate solution and lime may be conducted in any suitable device in which the reactants are vigorously agitated, and in which the residence time is sufficient to ensure that the lime is substantially converted to substituted TCA, with little or no unreacted lime, residual hydrocalumite or calcium carbonate. An example of a reactor suitable for this purpose is a simple stirred tank equipped with a mechanically-driven agitator. A parallel connection of smaller reactors may also be used, although there is no particular advantage to doing so. A series connection of two or more tanks may give a slight improvement in performance. At a temperature of 97° C., a total slurry residence time of between 2 and 4 hours is sufficient to ensure that the reaction is substantially complete, although longer residence times have no deleterious effects.

To ensure complete conversion, the reaction should be conducted at a temperature sufficiently high that the lime is substantially or fully converted to substituted TCA within the available residence time of the reactor. A suitable temperature range is between 80° C. and 195° C., preferably between 95° C. and 105° C. Heat may be provided either by indirect heating of the caustic aluminate and/or lime slurry using a plate or shell and tube heat exchanger or similar device, or by sparging steam directly into the reactant mixture within the reactor. A combination of both techniques is also suitable, and avoids loss of efficiency resulting from excessive dilution of the reactant mixture by the steam.

The relative flows of the caustic aluminate solution and the lime slurry should be adjusted such that the anionic impurity is not depleted before full reaction of the lime is complete. If this occurs, the remainder of the lime will react solely with the tetrahydroxy aluminate ion, resulting in poor lime efficiency and unnecessary waste of alumina. The correct volumetric ratio of the caustic aluminate solution to lime slurry will depend on several factors, including the nature of the equilibrium between the anionic impurity and the tetrahydroxy aluminate ion, the concentration of these two species, and the available CaO in the lime slurry, and cannot be determined without knowledge of each of these factors. However, as an example, for maximum efficiency of removal of sodium fluoride at an initial concentration of approximately 2 g/L in a typical green liquor with an initial A/C ratio of 0.7, a liquor to lime ratio (v/v) of close to 10:1 will be required, for a typical lime slurry consisting of 15% (w/w) CaO. By comparison, a typical liquor to lime slurry ratio for the preparation of TCA filter aid is of the order of 2.5:1.

The purified caustic aluminate solution and anion-substituted TCA may be utilised in any manner that suggests itself to persons skilled in the chemical engineering arts. Since the substituted TCA is both highly crystalline and chemically inert, one obvious application in an alumina refinery is to use this process as a substitute for the preparation of conventional TCA filter aid. This has the very significant potential advantage of requiring the consumption of little or no additional lime and alumina above that already consumed by the refinery for its filter aid requirements.

Anion-substituted TCA surplus to the refinery's filtration requirements may be directed to the mud settlers, for example, for efficient recovery of the purified caustic aluminate liquor, with subsequent disposal of the thermodynamically stable substituted TCA with the refinery's mud residue.

Alternatively, the purified caustic aluminate solution and anion-substituted TCA may be separated by any suitable solid/liquid separation device, such as a pressure filter, cyclone or gravity settler, returning the purified aluminate solution to the refinery. The purified solids may then be optionally washed, separated from the washings (which are recovered and recycled to the refinery), and the solids subsequently utilised for recovery of the incorporated values.

The invention is further described and illustrated by the following example. This example is illustrative of a variety of possible implementations and is not to be construed as limiting the invention in any way.

EXAMPLE

A basic implementation of the process for the removal of anionic impurities from caustic aluminate solutions is shown in FIG. 1. In this example, quicklime is reacted in a conventional slaker 10 with a suitable slaking solution (for example, water recovered from an alumina refinery's lake system), and stored in an agitated storage tank 12. The lime slurry is pumped at the required rate to a mechanically agitated reaction vessel 14, where it is reacted with concentrated caustic aluminate solution containing the target anionic impurity. The temperature in this tank is maintained at between 95° C. and 105° C. by sparging steam directly into the tank. The caustic aluminate liquor is optionally fortified with the anionic impurity by mixing it in a mixing tank 16 with a solution, slurry or cake of the impurity, obtained, for example, from a deep evaporator.

Following reaction, the anion-substituted TCA may be used as a replacement for the refinery's conventional TCA filter aid, pumped to the mud settling tans for recovery of the purified aluminate solution and disposal of the solid, or treated to recover the values.

Results of Laboratory Tests

In these tests, the anionic impurity targeted for removal was the fluoride ion, and reaction conditions were varied with this objective in mind. However, the effect of the process on several other common inorganic impurities was also monitored.

Effect of Aluminate Concentration

A sample of a spent liquor from an alumina refinery was collected from the refinery and analysed for its 'A', 'C', and 'S' content by titration, sodium fluoride by ion-selective electrode, and for other inorganic anions by ICP (with the impurities expressed as their equivalent oxide concentrations in mg/L). The liquor was divided into three portions, and gibbsite dissolved in two of them to create a range of liquors with three different concentrations of sodium aluminate.

1200 mL of each of the three liquor samples were placed into 2 liter Parr reactors and preheated to 97° C., and agitated using a dual pitched-blade turbine impeller at 400 rpm.

A sample of slaked lime slurry was obtained from the refinery and the solids content and available CaO determined. 80 mL of this slurry was added to each of the reactors, giving a liquor:lime slurry ratio of 15:1. This value was selected to ensure that sufficient mass of fluoride was available to fully react with the lime.

Samples of the mixture were withdrawn immediately after mixing, at 6 minutes, 1 hour and at 2 hours, at which point the reactor was switched off and the slurry filtered to recover the solids. The solids were washed and dried and retained for analysis by XRF.

Results obtained at 2 hours are summarised in Tables 1 and 2 below:

TABLE 1

Liquor composition at start and end of A/C effect test

| | Time (h) | A (g/L) | C (g/L) | S (g/L) | A/C | NaF (g/L) | V2O5 (mg/L) | TiO2 (mg/L) | P2O5 (mg/L) | CaO (mg/L) |
|---|---|---|---|---|---|---|---|---|---|---|
| Spent liquor | — | 101.8 | 226.1 | 269.7 | 0.450 | 2.09 | 495 | 1.88 | 143 | 10.2 |
| Low A/C | 0 | 92.3 | 217.3 | 257.6 | 0.425 | 2.01 | 475 | 1.80 | 137 | |
| Mid A/C | 0 | 122.2 | 211.7 | 252.5 | 0.577 | 1.96 | 463 | 1.76 | 134 | |
| High A/C | 0 | 142.5 | 206.7 | 246.5 | 0.69 | 1.91 | 452 | 1.72 | 131 | |
| Low A/C | 2 | 92.4 | 218.3 | 258.9 | 0.423 | 1.42 | 394 | 0.1 | 25 | 6.9 |
| Mid A/C | 2 | 120.2 | 211.5 | 252.5 | 0.568 | 0.97 | 348 | 0.02 | 19 | 7.7 |
| High A/C | 2 | 142.2 | 206.4 | 246.5 | 0.689 | 0.837 | 295 | 0.05 | 16 | 10.2 |

TABLE 2

Removal Rate of Impurities, tonnes per tonne of CaO added (2 hr res.time).

| Analyte Removed | Low A/C | Mid A/C | High A/C |
|---|---|---|---|
| NaF (tNaF/tCaO) | 0.058 | 0.090 | 0.111 |
| V$_2$O$_5$ (tV$_2$O$_5$/tCaO) | 0.008 | 0.011 | 0.015 |
| TiO$_2$ (tTiO$_2$/tCaO) | 0.0002 | 0.0002 | 0.0002 |
| P$_2$O$_5$ (tP$_2$O$_5$/tCaO) | 0.011 | 0.011 | 0.011 |

Examination of the data in Table 1 shows that in all cases there is a substantial 10 reduction in the concentration of these anionic impurities in solution. For phosphate and titanate, the residual concentration is extremely low, and implies that for these impurities at least, removal was restricted by depletion of the anion and that further removal may have been possible if the solution had been enriched with these anions.

Figure 2:
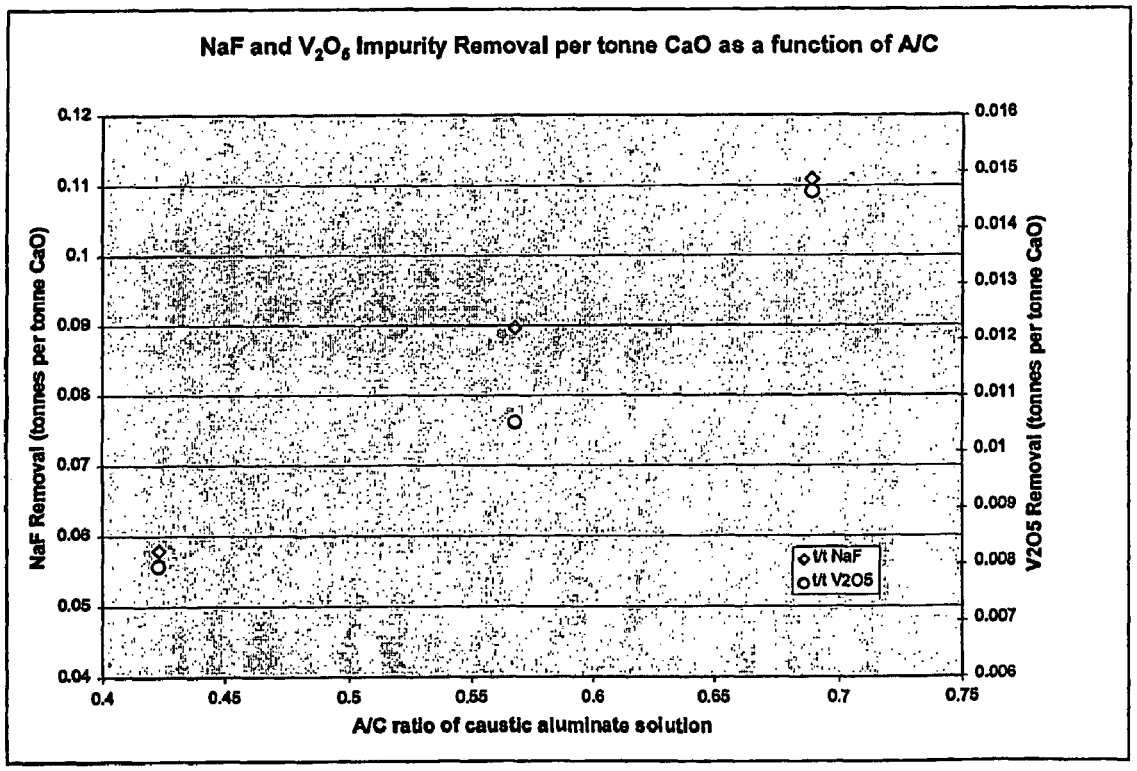
FIG. 2 illustrates graphically data for the removal of fluoride and vanadate at various A/C ratios of a caustic aluminate solution.

Table 2 demonstrates the mass of impurity removed per tonne of CaO used, expressed as tonnes of the sodium salt in the case of fluoride, and as tonnes of the equivalent oxide for the other species. The removal rate of fluoride and vanadate are clearly related to the A/C of the caustic aluminate solution, with the high A/C liquor resulting in approximately double the removal rate of these anions relative to the low A/C case. This relationship can be seen more clearly in FIG. 2, which depicts the data for the removal of fluoride and vanadate.

It should also be noted that since the product is a highly insoluble substituted TCA, the residual calcium concentration in the purified liquor is low. This is demonstrated in Table 1, which shows that in the low and mid A/C cases, there is a net reduction in calcium concentration in the purified liquor, while in the high A/C case the concentration is the same as the untreated liquor. This behaviour is in stark contrast to existing techniques for titanium and phosphorus control in an alumina refinery (lime addition within or prior to digestion), which often leads to an increase in liquor calcium concentration and subsequent calcia contamination of the product alumina.

Effect of Liquor to Lime Ratio

A sample of "pregnant" liquor was collected from an alumina refinery and an analysis of the 'A', 'C', 'S' and NaF contents was conducted. The density of this liquor was also determined. Approximately 400 g of this liquor was accurately weighed into each of three 500 mL polypropylene bottles, which were then sealed and placed in a rolling-bottle water bath to equilibrate to a temperature of 97° C.

A sample of slaked lime slurry was collected from an alumina refinery, and the solids content and available CaO determined. The sample bottles were removed from the water bath and 134.2 g, 68.9 g and 33.6 g of the lime slurry was then weighed into each of the bottles, to give liquor:lime slurry ratios (v/v) of 2.5:1, 5:1 and 10:1 respectively. The bottles were then re-sealed and returned to the water bath, where they were rotated end-over-end for a total period of 4 hours at a temperature of 97° C.

Results of this test are summarised in Table 3 below.

TABLE 3

Effect of Liquor: Lime slurry (v/v) ratio on NaF removal efficiency

| Sample | 'A' (g/L) | 'C' (g/L) | 'S' (g/L) | NaF (g/L) | Total volume (mL) | NaF Removal (t/t CaO) |
|---|---|---|---|---|---|---|
| Start Liquor | 162.6 | 219.7 | 264.1 | 2.08 | 294 | — |
| 2.5:1 | 96.5 | 177.5 | 209.5 | 0.04 | 366.4 | 0.031 |
| 5:1 | 125.4 | 197.7 | 234 | 0.07 | 331.8 | 0.060 |
| 10:1 | 143.8 | 209.9 | 250.1 | 0.41 | 310.3 | 0.100 |

Examination of the NaF concentration at the conclusion of the test shows that for the 2.5:1 and 5:1 cases, there is very little residual fluoride remaining in the solution, but a moderate amount remaining in the 10:1 case. These data confirm that in the low volumetric ratio cases, the fluoride had become depleted prior to completion of the reaction, resulting in incomplete incorporation of fluoride into the substituted TCA. However, the NaF removal rate (t/t CaO) for the 10:1 case is similar to that obtained for the high A/C liquor in the preceding test, in which the liquor:lime slurry ratio was 15:1. This indicates that, for liquor similar to that used in this test in which the NaF concentration is approximately 2 g/L, a liquor to lime slurry ratio of 10:1 is sufficient to obtain maximum removal.

Figure 3:
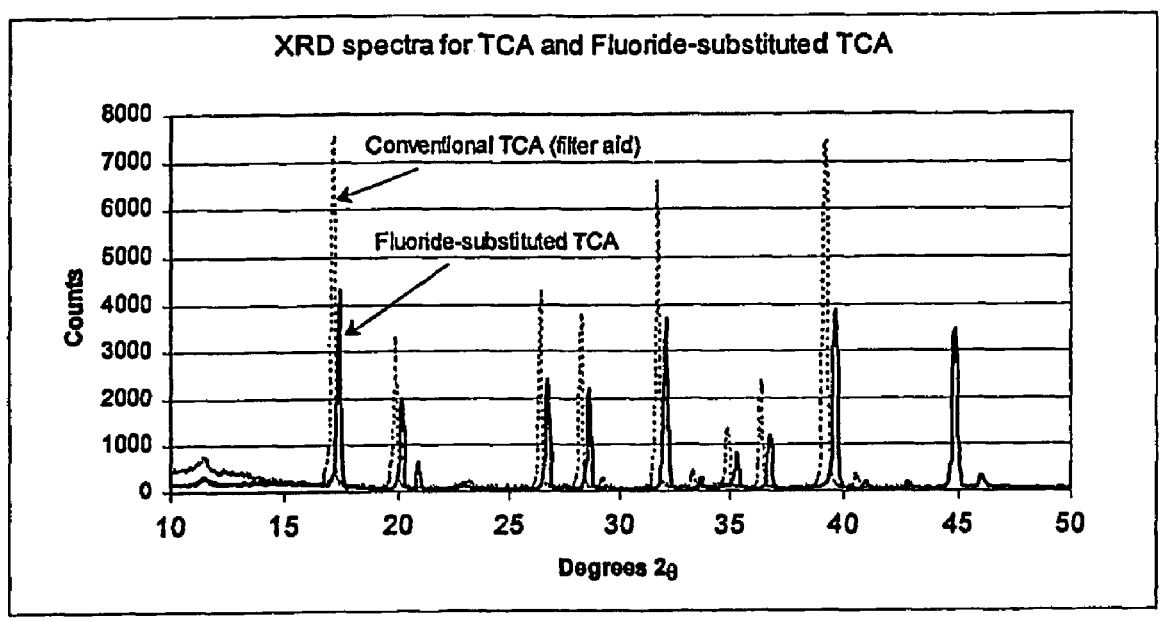
FIG. 3 illustrates graphically XRD spectra in which a standard TCA precipitate is compared with a substituted TCA precipitate produced in accordance with the process of the present invention.

The incorporation of the impurity anions into the substituted TCA has the effect of altering the lattice parameters of the TCA. This results in a change in the position and relative peak intensities of the XRD spectrum of the substituted TCA relative to unsubstituted TCA. The shift in the peak positions may be used as a diagnostic of the extent of impurity incorporation, with greater substitution causing a correspondingly greater shift. This effect is shown in FIG. 3, in which a standard TCA (produced for filter aid purposes) is compared with the substituted TCA produced in the 10:1 case described above. It should be noted that despite the high concentration of fluoride incorporated in the solid, there are no peaks in this spectrum corresponding to calcium fluoride, despite the exceedingly low solubility of this material in aqueous solutions, further demonstrating that the anion is removed via substitution into the TCA structure.

Effect of Supplementing the Anionic Impurity Concentration

This test demonstrates that the quantity of impurity incorporated into the substituted TCA increases if the concentration of the anionic impurity in solution is raised, thereby increasing the concentration of the substituted aluminate ion in the caustic aluminate solution.

A sample of "pregnant" liquor was collected from an alumina refinery and an analysis of the 'A', 'C', 'S' and NaF contents was conducted. The density of this liquor was also determined. Approximately 400 g of this liquor was accurately weighed into two 500 mL polypropylene bottles. Into one of these bottles, 15 mL of 40 g/L NaF solution was added, so as to increase the NaF concentration by approximately 2 g/L. 15 mL of deionised water was added to the second bottle to dilute the sample to the same extent. This second bottle thus acted as the control for this test. The bottles were then sealed and placed in a rolling-bottle water bath to equilibrate to a temperature of 97° C.

A sample of slaked lime slurry was collected from an alumina refinery, and the solids content and available CaO determined. The sample bottles were removed from the water bath and 34.7 g of this slurry were weighed into each of the bottles, giving a liquor:lime slurry ratio (v/v) of approximately 15:1. The bottles were then re-sealed and returned to the water bath, where they were rotated end-over-end for a total period of 4 hours at a temperature of 97° C.

Results of this test are summarised in Table 4 below.

TABLE 4

Effect of increasing impurity concentration on NaF removal efficiency

| Sample | 'A' (g/L) | 'C' (g/L) | 'S' (g/L) | NaF (g/L) | Total volume (mL) | NaF Removal (t/t CaO) |
|---|---|---|---|---|---|---|
| Start Liquor (spiked with NaF) | 140.7 | 201.6 | 236.2 | 3.64 | 315 | — |
| Start Liquor (Control) | 140.5 | 201.7 | 236.1 | 1.73 | 315 | — |
| Spiked Liquor (4 hrs) | 137.2 | 201.4 | 238.8 | 1.12 | 339.4 | 0.150 |
| Control (4 hours) | 137.4 | 200.6 | 237.5 | 0.36 | 339.4 | 0.083 |

In this test, increasing the initial NaF concentration by a factor of 2, gave a proportionally similar increase in the mass of NaF removed per tonne of lime, rising from 0.083 to 0.150 tonnes per tonne of CaO added. This latter removal rate is substantially higher than was achieved in the tests examining the effect of A/C, however the removal rate for the control may be lower (0.083 vs 0.111). The discrepancy with the control may be related to the different agitation conditions used in the two tests (since the formation of TCA is diffusion controlled), and suggests that a higher removal rate may have been achievable with the "spiked" fluoride liquor.

Now that an example of the preferred embodiment of the process has been presented, several advantages of the new process are apparent. These include:

(a) The process provides for the first time a practical means of removing fluoride and vanadate ions from caustic aluminate solutions, together with a range of other anions including phosphate and titanate.

(b) The process can be tailored to achieve efficient removal of a single impurity, or effect the removal of a broad spectrum of anionic impurities.

(c) The process is simple and cheap to implement, using equipment and raw materials already in common use within the alumina industry.

(d) The process is well suited for implementation as a side-stream operation, and would therefore not interfere with plant operation.

(e) The process results in a low concentration of dissolved calcium in the purified liquor, and therefore would not compromise the calcia content of an alumina refinery's product.

(f) The waste product of the process is a crystalline solid that is highly stable in caustic aluminate solutions, and may be used as an alternative to an alumina refinery's filter aid. In this instance, it may be possible to simultaneously achieve the refinery's filter aid and anionic impurity removal requirements, without using any additional lime above the refinery's existing consumption for filter aid production.

(g) The thermodynamic stability of the substituted TCA waste product makes disposal of the material straightforward. It may be discarded at any suitable location within the alumina refinery such that it reports to the refinery's existing residue stream. The stability and low solubility of the product ensure that the removed anions do not return with recovered (lake or process) water.

(h) Anionic impurities are concentrated within the waste product to a level that makes recovery of the values feasible.

Numerous variations and modifications will suggest themselves to persons skilled in the mineral processing arts, in addition to those already described, without departing from the basic inventive concepts. For example, the process could be incorporated into a conventional causticisation circuit consisting of two or more series-connected tanks, by adding sufficient lime to the first tank to causticise the liquor, and then charging a concentrated liquor (preferably fortified with the impurity anion) and additional lime to the second tank to effect the formation of substituted TCA. All such variations and modifications are to be considered within the scope of the present invention, the nature of which is to be determined from the foregoing description and the appended claims.

The invention claimed is:

1. A process for removing anionic impurities from a caustic solution having aqueous tetrahydroxy aluminate ions therein, the process comprising the steps of:
   substituting at least one hydroxyl group in the aqueous tetrahydroxy aluminate ions with an anionic impurity, via a reaction between the tetrahydroxy aluminate ions and the anionic impurity, to form substituted aluminate ions; and,
   removing the substituted aluminate ions.

2. A process according to claim 1 further comprising the step of increasing the concentration of the aqueous tetrahydroxy aluminate ions in the caustic solution.

3. A process according to claim 1 further comprising the step of increasing the concentration of anionic impurities in the caustic solution.

4. A process according to claim 1 comprising the step of increasing the concentration of the tetrahydroxy aluminate ions and the concentration of the anionic impurities in the caustic solution.

5. A process according to claim 1 further comprising the step of adding to the solution one or more target anionic impurities selected from the group consisting of fluorides, vanadates, phosphates, titanates and combinations thereof.

6. A process as defined in claim 5, wherein one or each of the target anionic impurities is added in the form of a precipitated salt of the target anionic impurity.

7. A process according to claim 1 wherein the step of removing the substituted aluminate ions includes the step of reacting the substituted aluminate ions with a calcium compound to precipitate substituted tri-calcium aluminate incorporating said anionic impurities.

8. A process according to claim 7 wherein the step of reacting the substituted aluminate ions with a calcium compound is performed to complete consumption of the calcium compound.

9. A process according to claim 7 wherein the calcium compound is calcium hydroxide.

10. A process according to claim 7 wherein the calcium compound is present in a slaked lime slurry.

11. A process according to claim 1 further comprising the step of agitating the caustic solution.

12. A process according to claim 9 wherein the step of agitating comprises the step of vigorously agitating the caustic solution.

13. A process according to claim 1 further comprising the step of heating the caustic solution.

14. A process according to claim 13 wherein the step of heating is conducted at a temperature within the range of 80° C. to 195° C.

15. A process according to claim 13 wherein the step of heating is conducted at a temperature in the range of 95° C. to 105° C.

16. A process according to claim 1 wherein the caustic solution has a high 'C'.

17. A process according to claim 16 wherein the 'C' is greater than 150 g/L.

18. A process according to claim 16 wherein the 'C' is greater than 200 g/L.

19. A process according to claim 1 wherein the caustic solution has an 'A/C' ratio greater than 0.65.

20. A process according to claim 1 wherein the caustic solution has an 'A/C' between 0.425 and 0.69.

21. A process according to claim 10 further comprising the step of adjusting the relative volumetric ratio of the caustic solution to the lime slurry to be at least 10:1.

22. A process according to claim 21 wherein the relative volumetric ratio of the caustic solution to the lime slurry is at least 15:1.

23. A process according to claim 21 wherein the concentration of lime slurry is not greater than 15% w/w of CaO.

24. A process according to claim 7 further comprising the step of removing precipitated substituted TCA.

25. A process according to claim 24 comprising the step of recovering at least one of the anionic impurities from the precipitated substituted TCA.

26. A process according to claim 25 wherein the anionic impurities recovered are selected from the group consisting of fluorides, vanadates, phosphates, titanates and combinations thereof.

27. A process according to claim 24 further comprising the step of using the removed precipitated substituted TCA as a filter aid.

28. A process according to claim 1 further comprising the step of adding to the solution one or more target anionic impurities selected from the group consisting of fluorides, vanadates, titanates and combinations thereof.

* * * * *